(12) United States Patent
Narikawa

(10) Patent No.: US 8,757,813 B2
(45) Date of Patent: Jun. 24, 2014

(54) LIGHT SOURCE DEVICE, PROJECTION APPARATUS, AND PROJECTION METHOD

(75) Inventor: Tetsuro Narikawa, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 665 days.

(21) Appl. No.: 12/948,811

(22) Filed: Nov. 18, 2010

(65) Prior Publication Data

US 2011/0128509 A1  Jun. 2, 2011

(30) Foreign Application Priority Data

Nov. 27, 2009  (JP) ................................. 2009-270515

(51) Int. Cl.
  *H05B 41/16* (2006.01)
  *G03B 21/14* (2006.01)
  *H05B 37/02* (2006.01)

(52) U.S. Cl.
  USPC ............................................. 353/85; 315/291

(58) Field of Classification Search
  USPC .......................................................... 353/85
  See application file for complete search history.

(56) References Cited

U.S. PATENT DOCUMENTS

| 8,169,159 | B2 * | 5/2012 | Lu et al. | 315/307 |
| 8,228,001 | B2 * | 7/2012 | Fan | 315/291 |
| 2007/0138979 | A1 * | 6/2007 | Yamada et al. | 315/291 |
| 2011/0025219 | A1 * | 2/2011 | Samejima et al. | 315/246 |
| 2011/0068700 | A1 * | 3/2011 | Fan | 315/185 R |
| 2011/0089859 | A1 * | 4/2011 | Tseng et al. | 315/294 |

FOREIGN PATENT DOCUMENTS

| CN | 1845401 A | 10/2006 |
| JP | 2004-341105 A | 12/2004 |
| JP | 2007-25466 A | 2/2007 |
| JP | 2007-171364 A | 7/2007 |
| JP | 2009-117716 A | 5/2009 |

OTHER PUBLICATIONS

Korean Office Action dated May 24, 2012 (and English translation thereof) in counterpart Korean Application No. 10-2010-0118678.
Japanese Office Action dated May 29, 2012 (and English translation thereof) in counterpart Japanese Application No. 2009-270515.
Japanese Office Action dated Dec. 6, 2011 (and English translation thereof) in counterpart Japanese Application No. 2009-270515.
Chinese Office Action dated Feb. 27, 2013 (and English translation thereof) in counterpart Chinese Application No. 201010569144.0.

* cited by examiner

*Primary Examiner* — William C Dowling
(74) *Attorney, Agent, or Firm* — Holtz Holtz Goodman & Chick PC

(57) ABSTRACT

A light source device includes a plurality of semiconductor light source elements, and a drive control section configured to cyclically supply a power signal with a sawtooth pulse waveform in which a crest value at the rise time is larger than a crest value at the fall time to each of the plurality of semiconductor light source elements by time division to thereby light-emission-drive the semiconductor light source elements.

7 Claims, 3 Drawing Sheets

LIGHT SOURCE DEVICE, PROJECTION APPARATUS, AND PROJECTION METHOD

CROSS-REFERENCE TO RELATED APPLICATIONS

This application is based upon and claims the benefit of priority from the prior Japanese Patent Application No. 2009-270515, filed Nov. 27, 2009, and including specification, claims, drawings and summary, the entire contents of which are incorporated herein by reference.

BACKGROUND OF THE INVENTION

1. Field of the Invention

The present invention relates to a light source device, a projection apparatus, and a projection method that are suitable for a projector or the like.

2. Description of the Related Art

For a projector, many techniques using a semiconductor laser or light-emitting diode as a light source have been considered.

A semiconductor light source such as a semiconductor laser and light-emitting diode is very small in element size, and is capable of emitting light at high luminance. On the other hand, the semiconductor light source has a drawback in that the semiconductor light source is easily subject to an influence of heat when it is operated at a high temperature for a long period of time, which results in high deterioration thereof and a greatly shortened lifespan.

BRIEF SUMMARY OF THE INVENTION

According to one aspect of the present invention, there is provided a light source device comprising: a plurality of semiconductor light source elements; and a drive control section configured to cyclically supply a power signal with a sawtooth pulse waveform in which a crest value at a rise time is larger than a crest value at a fall time to each of the plurality of semiconductor light source elements by time division to thereby light-emission-drive the semiconductor light source elements.

According to another aspect of the present invention, there is provided a projection apparatus comprising: a plurality of semiconductor light source elements; a drive control section configured to cyclically supply a power signal with a sawtooth pulse waveform in which a crest value at a rise time is larger than a crest value at a fall time to each of the plurality of semiconductor light source elements by time division to thereby light-emission-drive the semiconductor light source elements; an input section configured to input an image signal; and a projection section configured to form a light figure corresponding to an image signal input from the input section by using light emitted from each of the plurality of semiconductor light source elements, and project the formed light figure.

According to still another aspect of the present invention, there is provided a projection method for use in a projection apparatus including a plurality of semiconductor light source elements, an input section configured to input an image signal, and a projection section configured to form a color light figure corresponding to an image signal input from the input section by using light emitted from each of the plurality of semiconductor light source elements, and project the formed light figure, the method comprising: cyclically supplying a power signal with a sawtooth pulse waveform in which a crest value at a rise time is larger than a crest value at a fall time to each of the plurality of semiconductor light source elements by time division to thereby light-emission-drive the semiconductor light source elements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of a case where the present invention is applied to a Digital Light Processing (DLP) (registered trademark) data projector will be described below with reference to the drawings.

Figure 1:
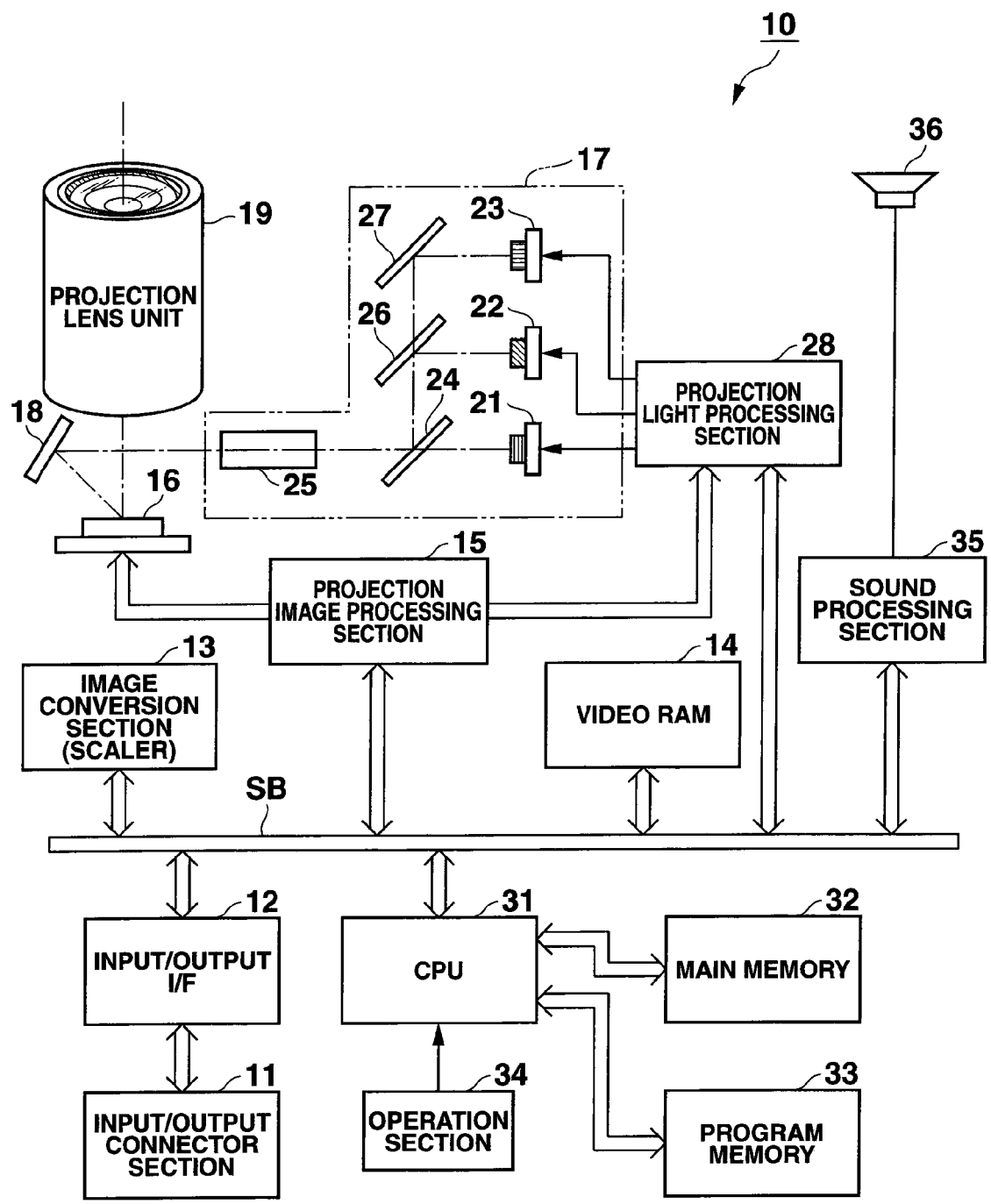
FIG. 1 is a block diagram showing the functional configuration of a data projector.

FIG. 1 is a block diagram showing the schematic functional configuration of a data projector 10 according to this embodiment.

An input/output connector section 11 includes various input/output terminals such as a pin jack (RCA) video input terminal, D-sub 15 RGB input terminal, and Universal Serial Bus (USB) connector.

Image signals of various standards input from the input/output connector section 11 are input to an image conversion section 13 (generally called a scaler) through an input/output interface (I/F) 12 and system bus SB.

The image conversion section 13 converts the input image signals into image signals of a predetermined format suitable for projection, and writes the converted image signals to a video RAM 14 which is a buffer memory for display. Thereafter, the image conversion section 13 reads the image signals, and transmits them to a projection image processing section 15.

At this time, data such as symbols representing various operating conditions for On-Screen Display (OSD) are superposed on the image signals by the video RAM 14 as the need arises, and the image signals thus processed are read and transmitted to the projection image processing section 15.

The projection image processing section 15 drives a micromirror element 16, i.e., a Spatial Light Modulator (SLM) by a time division number which is a continued product of a predetermined frame rate, for example, 60 [frames/sec], division number of the color component, and display gradation number according to the image signal that has been transmitted thereto.

In the micromirror element 16, an inclination angle of each of a plurality of minute mirrors of a number corresponding to, for example, XGA (1024 lateral pixels×768 longitudinal pixels) arranged in an array is subjected to an on/off operation at high speed, whereby a light figure is formed by the light reflected off the minute mirrors.

On the other hand, primary color light components of red, green, and blue are cyclically emitted from a light source section 17 by time division. The primary color light components from the light source section 17 are totally reflected from a mirror 18, and are applied to the micromirror element 16.

Further, a light figure is formed by the reflected light from the micromirror element. The formed light figure is projected and displayed on a screen (not shown), which is a projection target, through a projection lens unit 19.

The light source section 17 includes a light-emitting diode (hereinafter referred to as an "R-LED") 21 configured to emit red light, light-emitting diode (hereinafter referred to as a "G-LED") 22 configured to emit green light, and light-emitting diode (hereinafter referred to as a "B-LED") 23 configured to emit blue light.

The red light emitted from the R-LED 21 is transmitted through a dichroic mirror 24, thereafter is formed into a light flux having substantially uniform luminance distribution by an integrator 25, and is then sent to the mirror 18.

The green light emitted from the G-LED 22 is reflected from a dichroic mirror 26, is thereafter reflected also from the dichroic mirror 24, and is then sent to the mirror 18 through the integrator 25.

The blue light emitted from the B-LED 23 is reflected from a mirror 27, is thereafter transmitted through the dichroic mirror 26, is then reflected from the dichroic mirror 24, and is then sent to the mirror 18 through the integrator 25.

The dichroic mirror 24 transmits the red light therethrough, whereas the mirror 24 reflects the green light and blue light. The dichroic mirror 26 reflects the green light, whereas the mirror 26 transmits the blue light therethrough.

A projection light processing section 28 controls the light emission timing of each of the LEDs 21 to 23 of the light source section 17, waveform of the drive signal, and the like in a unifying manner. The projection light processing section 28 controls the light emission operation of each of the LEDs 21 to 23 in accordance with the image data timing supplied from the projection image processing section 15, and control of a CPU 31 to be described later.

The CPU 31 controls the operation of each of the circuits described above. The CPU 31 is directly connected to a main memory 32, and program memory 33. The main memory 32 is constituted of a DRAM, and functions as a work memory of the CPU 31. The program memory 33 is constituted of an electrically rewritable nonvolatile memory, and stores therein an operation program to be executed by the CPU 31, various fixed-type data items, and the like. The CPU 31 executes the control operation in the data projector 10 by using the main memory 32, and program memory 33. Further, the CPU 31 executes various projection operations in accordance with a key operation signal from an operation section 34.

The operation section 34 includes a key operation section provided in the main body of the data projector 10, and laser reception section configured to receive infrared light from a remote controller (not shown) to be exclusively used for the data projector 10. When the user operates the key operation section or the remote controller, the operation section 34 directly outputs a key operation signal based on the key operation of the user to the CPU 31.

The CPU 31 is further connected to a sound processing section 35 through the system bus SB. The sound processing section 35 is provided with a sound source circuit such as a PCM sound source or the like, converts the sound data input at the time of the projection operation into analog data, and drives a speaker section 36 to loudspeaker-release the sound or generate a beep sound or the like as the need arises.

Next, an operation of the embodiment will be described below.

It should be noted that the micromirror element 16 carries out a display operation by being directly driven by the projection image processing section 15, whereas the LEDs 21 to 23 intermittently carry out a light emitting operation in sequence by being directly driven by the projection light processing section 28. Both the projection image processing section 15 and projection light processing section 28 operate under the control of the CPU 31 as described above. The CPU 31 reads the operation program and the like stored in the program memory 33, spreads the resultant on the main memory 32, and executes the control processing.

Figure 2:
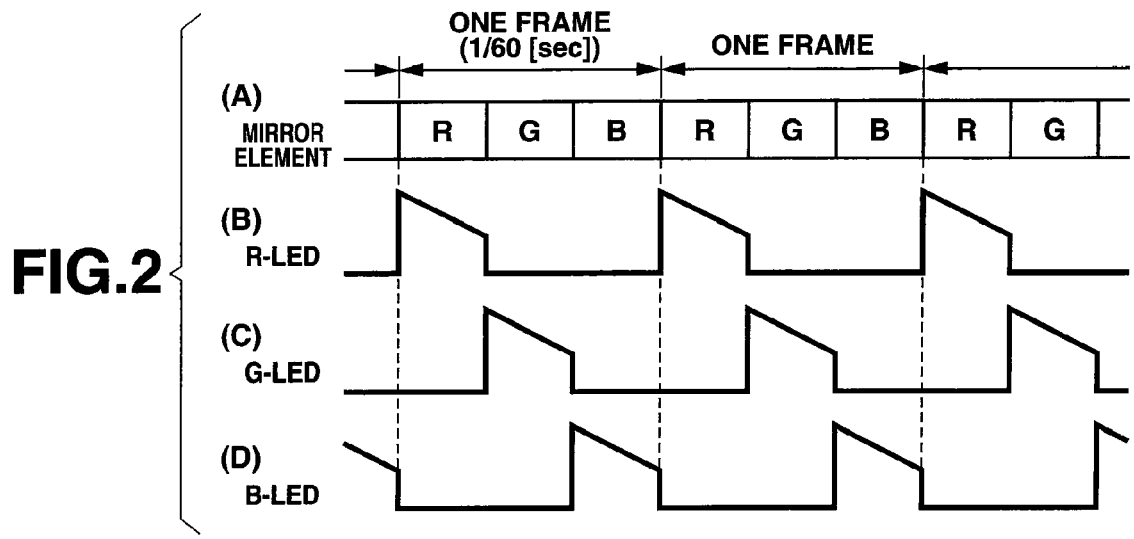
FIG. 2 is a timing chart exemplifying an RGB field constituting a frame of a color image, and waveforms of drive currents given to the LEDs.

In FIG. 2, (A) shows the projection timing of each of the fields of red, green, and blue constituting one frame of the color image. Further, each of (B) to (D) shows a waveform of a drive current to be supplied to each of LEDs 21 to 23 of the light source section 17.

The projection light processing section 28 intermittently drives the LEDs 21 to 23 in accordance with each of the fields of red, green, and blue as shown in (B) to (D) of FIG. 2 in order to project the color light figure in synchronization with the display operation of the micromirror element 16.

As described above, when the frame rate of the image data is 60 [frames/sec], the period per one field is 1/180 [sec]. Accordingly, the projection light processing section 28 intermittently light-emission-drives each of the LEDs 21 to 23 in sequence for 1/180[sec] in a cycle of 1/60 [sec] with a signal waveform as shown in FIG. 2.

Figure 3:
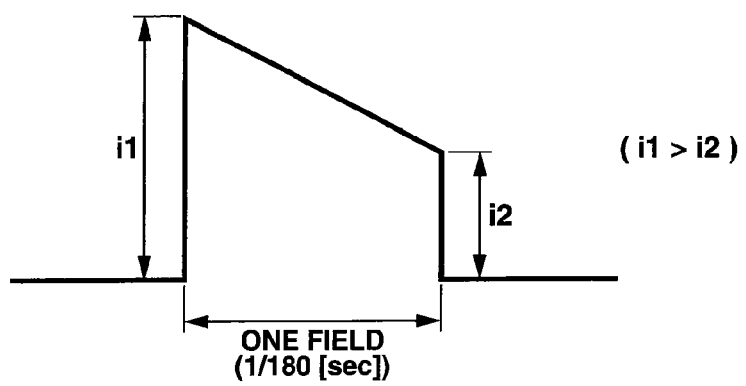
FIG. 3 is a view showing a drive current waveform of an LED.

In FIG. 3, a signal waveform with which the projection light processing section 28 drives each of the LEDs 21 to 23 is extracted and shown. The luminance adjustment of the LEDs 21 to 23 is carried out by current-value control. Accordingly, the projection light processing section 28 light-emission-drives the LEDs 21 to 23 by time division by supplying a sawtooth signal having a current waveform shown in FIG. 2 at a prescribed voltage to each of the LEDs 21 to 23.

That is, assuming that a crest value of the pulse waveform at the rise time is $i1$, and crest value thereof at the fall time is $i2$, a power signal having a sawtooth pulse waveform in which the crest value at the rise time is greater than the crest value at the fall time, and a relationship of "$i1>i2$" is secured without fail is cyclically supplied to each of the LEDs 21 to 23 by time division.

In general, the luminous efficiency of a semiconductor light source element such as an LED, LD (semiconductor laser) or the like becomes higher in a state of a lower temperature. Accordingly, in this embodiment, the luminous efficiency is increased by driving the light source element by a larger current value $i1$ at the time of rise from the state where the temperature is intermittently lowered. Thereafter, the current value is gradually decreased from the beginning over the latter half within the same pulse, thereby reducing the thermal storage amount in the light source element.

Figure 4A:
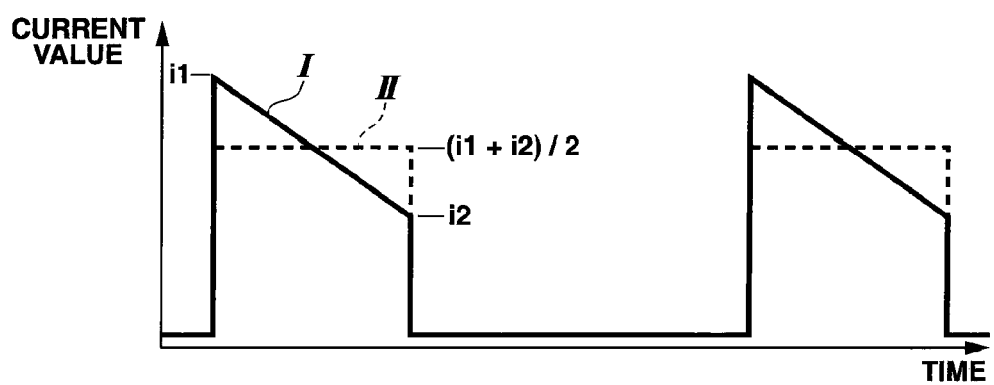
FIG. 4A is a view showing a sawtooth waveform of a drive current for driving the LED while comparing the drive current waveform with a general drive current waveform of a square-shape.
Figure 4B:
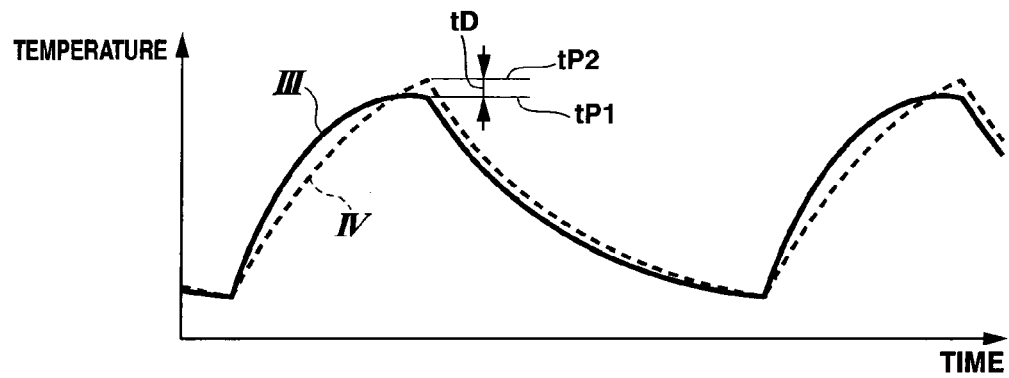
FIG. 4B is a view showing a temperature variation of a case where a sawtooth drive current is given to an LED while comparing the temperature variation with a temperature variation of a case where a general drive current of a square-shape is given to the LED.

FIGS. 4A and 4B show a temperature simulation for each of the LEDs 21 to 23 by the current value drive of the waveform described above. FIG. 4A shows the sawtooth waveform I of a signal to be supplied to each of the LEDs 21 to 23 by comparing it with a drive waveform II of a general drive current waveform of a square-shape.

When the crest value of the square wave II is "(i1+i2)/2" which is an intermediate value between the current values i1 and i2, the power itself consumed by each of the LEDs 21 to 23 with respect to each of the waveform I of this embodiment, and the square wave II is the same.

However, in the temperature change of each of the LEDs 21 to 23 shown in FIG. 4B, in the temperature change waveform III of a case where the signal shown by the waveform I is supplied to each of the LEDs 21 to 23, although the temperature abruptly rises by the crest value i1 of the current at the rise time of the pulse, thereafter the current value gradually decreases. As a result of this, the maximum temperature tP1 is held down to a lowered value, and in the subsequent interval, the temperature successively lowers.

As compared with the above, in the temperature change waveform IV of a case where a signal shown by the drive waveform II based on the general square wave described above is supplied to each of the LEDs 21 to 23, the temperature gradually rises from the rise time, and the current value does not change thereafter. As a result of this, the maximum temperature tP2 becomes higher than the temperature tP1, and the temperature successively lowers in the subsequent interval.

Accordingly, in the drive method according to this embodiment, it is possible to drive the LEDs 21 to 23 in a state in which the luminous efficiency is higher than the general drive method. Further, it becomes possible to hold the maximum temperature of the element down to a lower value by a difference tD between the maximum temperatures tP1 and tP2.

The temperature condition of the element is a big factor controlling the life of the semiconductor light source element including LEDs, and hence it becomes possible to make the life of the element longer by holding the maximum temperature at a lowered value.

Particularly, in a semiconductor light source element, it is known that due to the characteristic of correlation between the temperature and life, the life becomes abruptly short in an environment in which the temperature exceeds a certain threshold temperature. Accordingly, by setting the crest value at the rise time, and crest value at the fall time in order that the crest values may not exceed the threshold temperature due to the temperature characteristic of the semiconductor light source element, it becomes possible to make the life of the element longer while maintaining the luminous efficiency of the element at a high level.

Furthermore, in this embodiment, the LEDs 21 to 23 are assumed as the light source of the projector, and hence each of the LEDs 21 to 23 is intermittently driven as described above. Accordingly, as shown in FIGS. 4A and 4B, once each of the LEDs 21 to 23 is turned on, a vacant time is caused until the next turning-on time, and each of the LEDs is cooled in the vacant time. However, when the LEDs 21 to 23 are continuously driven for a long time, each time one frame is finished, the heat is gradually accumulated in the LEDs, and hence there occurs a situation in which the temperature is not sufficiently lowered within the vacant time. Even in such a case, when it is possible to hold the maximum temperature down to a lowered value as in the case of this example, it becomes possible to efficiently cool the LEDs by using the vacant time of the intermittent drive.

As has been described above in detail, according to this embodiment, it is possible to cause the LEDs to carry out light emission by supplying high power to the LEDs in a state in which the temperature is low, and luminous efficiency is high. As a result of this, in an environment in which the power consumption is limited, it is possible to hold the power necessary for obtaining desired light-emission luminance of the LEDs 21 to 23 down to a lower level. Further, in an environment in which the power consumption is not limited, it is possible to drive the LEDs 21 to 23, which are the light source elements, at a higher level of light-emission luminance.

Furthermore, due to the temperature characteristic of each element constituting each of the LEDs 21 to 23, by setting the crest value of the drive current at the rise time, and crest value thereof at the fall time in such a manner that the crest values do not exceed the preset threshold temperature, it is possible to make the life of each of the LEDs 21 to 23 longer while maintaining the luminous efficiency of the LEDs 21 to 23 at a higher level.

It should be noted that in the embodiment described above, the case where the LEDs 21 to 23 of the three primary colors are used as the elements of the light source has been described. However, the present invention is not limited to the LED, and can also be applied to an LD (semiconductor laser) in the same manner. Further, in the present invention, as far as a device in which a plurality of semiconductor light source elements are used, or a drive method of the device is concerned, the type of the element, number of constituent elements, and the like are not to be limited.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source device comprising:
a plurality of semiconductor light source elements; and
a drive control section configured to cyclically supply, to each of the plurality of semiconductor light source elements by time division, a power signal with a sawtooth pulse waveform in which a crest value at a rise time is larger than a crest value at a fall time and in which the crest value at the rise time and the crest value at the fall time are set such that a maximum temperature of the plurality of semiconductor light source elements when using the sawtooth pulse waveform is lower than a maximum temperature of the plurality of semiconductor light source elements when using a square pulse waveform for a same given value of supplied power of the power signal, to thereby light-emission-drive the semiconductor light source elements.

2. The light source device according to claim 1, wherein the drive control section is configured to supply the power signal in which the crest value at the rise time and the crest value at the fall time are set in accordance with a threshold based on a characteristic of correlation between a temperature and a life of each of the plurality of semiconductor light source elements to each of the plurality of semiconductor light source elements to thereby light-emission-drive the semiconductor light source elements.

3. A projection apparatus comprising:
a plurality of semiconductor light source elements;
a drive control section configured to cyclically supply, to each of the plurality of semiconductor light source elements by time division, a power signal with a sawtooth pulse waveform in which a crest value at a rise time is larger than a crest value at a fall time and in which the crest value at the rise time and the crest value at the fall time are set such that a maximum temperature of the plurality of semiconductor light source elements when using the sawtooth pulse waveform is lower than a maximum temperature of the plurality of semiconductor light source elements when using a square pulse waveform for a same given value of supplied power of the power signal, to thereby light-emission-drive the semiconductor light source elements;

an input section configured to input an image signal; and a projection section configured to form a light figure corresponding to an image signal input from the input section by using light emitted from each of the plurality of semiconductor light source elements, and to project the formed light figure.

4. A projection method for use in a projection apparatus including a plurality of semiconductor light source elements, an input section configured to input an image signal, and a projection section configured to form a color light figure corresponding to an image signal input from the input section by using light emitted from each of the plurality of semiconductor light source elements, and to project the formed light figure, the method comprising:

cyclically supplying, to each of the plurality of semiconductor light source elements by time division, a power signal with a sawtooth pulse waveform in which a crest value at a rise time is larger than a crest value at a fall time and in which the crest value at the rise time and the crest value at the fall time are set such that a maximum temperature of the plurality of semiconductor light source elements when using the sawtooth pulse waveform is lower than a maximum temperature of the plurality of semiconductor light source elements when using a square pulse waveform for a same given value of supplied power of the power signal, to thereby light-emission-drive the semiconductor light source elements.

5. The light source device according to claim 1, wherein the drive control section is configured to supply the power signal such that each on-state period of the pulse waveform of the plurality of semiconductor light source elements appears continuously and circularly, such that an on-state period of the pulse waveform of one of the plurality of semiconductor light source elements corresponds to an off-state period of pulse waveform of each of the other semiconductor light source elements.

6. The light source device according to claim 1, wherein the plurality of semiconductor light source elements include laser light source elements.

7. The light source device according to claim 5, wherein each on-state period corresponds to substantially 1/180 [sec].

* * * * *